(12) United States Patent
Jackson (10) Patent No.: US 9,558,042 B2
(45) Date of Patent: Jan. 31, 2017

(54) SYSTEM AND METHOD PROVIDING OBJECT MESSAGES IN A COMPUTE ENVIRONMENT

(75) Inventor: David B. Jackson, Spanish Fork, UT (US)

(73) Assignee: III HOLDINGS 12, LLC, Wilmington, DE (US)

( * ) Notice: Subject to any disclaimer, the term of this patent is extended or adjusted under 35 U.S.C. 154(b) by 1790 days.

(21) Appl. No.: 10/530,580

(22) PCT Filed: Mar. 11, 2005

(86) PCT No.: PCT/US2005/008278
§ 371 (c)(1),
(2), (4) Date: Apr. 7, 2005

(87) PCT Pub. No.: WO2005/089235
PCT Pub. Date: Sep. 29, 2005

(65) Prior Publication Data
US 2009/0187536 A1    Jul. 23, 2009

Related U.S. Application Data

(60) Provisional application No. 60/552,653, filed on Mar. 13, 2004.

(51) Int. Cl.
*G06F 9/48* (2006.01)
*G06F 9/50* (2006.01)
*G06F 15/16* (2006.01)

(52) U.S. Cl.
CPC .......... *G06F 9/5027* (2013.01); *G06F 9/4881* (2013.01); *G06F 9/505* (2013.01); *G06F 9/5011* (2013.01); *G06F 9/5072* (2013.01); *G06F 15/161* (2013.01); *G06F 2209/503* (2013.01); *G06F 2209/506* (2013.01); *G06F 2209/508* (2013.01); *G06F 2209/5014* (2013.01); *G06F 2209/5015* (2013.01); *G06F 2209/5022* (2013.01)

(58) Field of Classification Search
CPC ................ G06F 2209/5014; G06F 2209/5015; G06F 2209/5022; G06F 2209/503; G06F 2209/506; G06F 2209/508; G06F 9/505; G06F 9/5072
USPC ....................................................... 707/770
See application file for complete search history.

(56) References Cited

U.S. PATENT DOCUMENTS

| | | |
|---|---|---|
| 5,090,014 A | 2/1992 | Polich et al. |
| 6,401,174 B1 | 6/2002 | Hagersten et al. |
| 6,591,262 B1 * | 7/2003 | MacLellan et al. |
| 6,718,489 B1 | 4/2004 | Lee et al. |

(Continued)

*Primary Examiner* — Jorge A Casanova (57) ABSTRACT

The present invention provides a system, method and computer-readable media for creating object messages within a compute environment such as a cluster or grid. The method comprises upon an event affecting the availability or performance of an object within a cluster environment, retrieving messages related to the event from messages logs in different layers of a cluster environment. Next, the method comprises aggregating the retrieved messages into a single location, associating the aggregated messages with the object and, if a user submits a job and the performance of the job within the cluster environment is affected by the event, notifying the user of the event using the associated messages. Administrators may also create messages and associate the messages with objects such as nodes or reservations.

5 Claims, 6 Drawing Sheets

(56) References Cited

U.S. PATENT DOCUMENTS

| | | | |
|---|---|---|---|
| 7,533,168 B1* | 5/2009 | Pabla et al. | 709/224 |
| 7,721,152 B1* | 5/2010 | Joshi et al. | 714/25 |
| 2002/0038217 A1* | 3/2002 | Young | 705/1 |
| 2002/0078121 A1* | 6/2002 | Ballantyne | 709/102 |
| 2002/0083377 A1 | 6/2002 | Clauss et al. | |
| 2002/0120741 A1 | 8/2002 | Webb et al. | |
| 2002/0138582 A1* | 9/2002 | Chandra et al. | 709/206 |
| 2003/0084044 A1* | 5/2003 | Simpson et al. | 707/6 |
| 2003/0159088 A1 | 8/2003 | Phillips et al. | |
| 2003/0229693 A1* | 12/2003 | Mahlik et al. | 709/224 |
| 2003/0233446 A1 | 12/2003 | Earl | |
| 2004/0139202 A1 | 7/2004 | Talwar et al. | |
| 2004/0139374 A1 | 7/2004 | Meaney et al. | |
| 2004/0162880 A1* | 8/2004 | Arnone et al. | 709/206 |
| 2004/0199918 A1 | 10/2004 | Skovira | |
| 2004/0244006 A1 | 12/2004 | Kaufman et al. | |
| 2005/0091375 A1* | 4/2005 | Straub et al. | 709/226 |
| 2005/0097569 A1* | 5/2005 | Chandrasekaran | 719/318 |
| 2005/0278760 A1 | 12/2005 | Dewar et al. | |

\* cited by examiner

| | NODES | |
|---|---|---|
| Options | | |

Display
- Summary
- Description
- Configured Resources
- Usage Limits
- Allocated Priority
- Diagnostics
- Comments

| Node ID | State | Comments |
|---|---|---|
| opt-001 | Running | |
| opt-004 | Running | |
| opt-006 | Running | |
| opt-013 | Running | |
| x86-096 | Idle | |
| P690-001 | Idle | |
| opt-089 | Down | Offline for maintenance |
| opt-002 | Busy | Low On Memory |
| opt-003 | Busy | |
| opt-005 | Busy | |
| opt-008 | Busy | Low On Disk Space |
| opt-009 | Busy | |
| opt-010 | Busy | |
| opt-011 | Busy | |
| opt-012 | Busy | |
| opt-014 | Busy | |
| opt-015 | Busy | |
| opt-016 | Busy | |
| opt-017 | Busy | |
| opt-018 | Busy | Reserved for Mr. Taylor |
| opt-019 | Busy | |
| opt-020 | Busy | |
| opt-021 | Busy | |
| opt-022 | Busy | Replace motherboard |
| opt-023 | Busy | |
| opt-024 | Busy | |
| opt-025 | Busy | Processor Fan needs to be re |
| opt-026 | Busy | |
| opt-027 | Busy | 302 |
| opt-028 | Busy | |

☑ Fit-To-Screen    [Apply]  [Close]

FIG. 3B

| Name | Messages | Type |
|---|---|---|
| 13790 | High Priority | Job |
| 13937 |  | Job |
| 13904 |  | Job |
| 13542 |  | Job |
| 12950 |  | Job |
| 13047 |  | Job |
| 13067 |  | Job |
| 13854 |  | Job |
| 13668 |  | Job |
| 13283 |  | Job |
| 13284 |  | Job |
| 13477 | Low Priority | Job |
| 13954 |  | Job |
| 13680 |  | Job |
| 13558 |  | Job |
| 13030 | Data needs to be emailed t... | Job |
| 13732 |  | Job |
| 13574 |  | Job |
| 13697 |  | Job |
| 13914 | Reservation Resource Viol... | Job |
| 13771 |  | Job |
| 13099 |  | Job |
| 13748 | Remember to record | Job |
| 13953 |  | Job |
| 13173 |  | Job |
| 13822 | Required for Mr. Taylor to c... | Job |
| 13939 |  | Job |
| 13948 |  | Job |
| 13811 |  | Job |
| test.l |  | User |

Options:
- Display
- Summary
- Credentials
- Time
- Resources
- Required Resources
- Flags
- Nodes
- Statistics
- Diagnostics
- Comments
- Tasks
- Identification
- Trigger ☑ Fit-To-Screen     [Apply] [Close]

SYSTEM AND METHOD PROVIDING OBJECT MESSAGES IN A COMPUTE ENVIRONMENT

PRIORITY CLAIM

The present application claims priority to U.S. Provisional Application No. 60/552,653 filed Mar. 13, 2004, the contents of which are incorporated herein by reference.

RELATED APPLICATIONS

The present application is related to U.S. patent application Ser. Nos. 10/530,583; 10/530,582; 10/530,581; 10/530,577; 15/530,576; 10/589,339; 10/530,578; and 10/530,575; filed on the same day as the present application. The content of each of these cases is incorporated herein by reference.

BACKGROUND OF THE INVENTION

1. Field of the Invention

The present invention relates to clusters and more specifically a system and method of providing object messages within the context of managing resources within a compute environment.

2. Introduction

Figure 1:
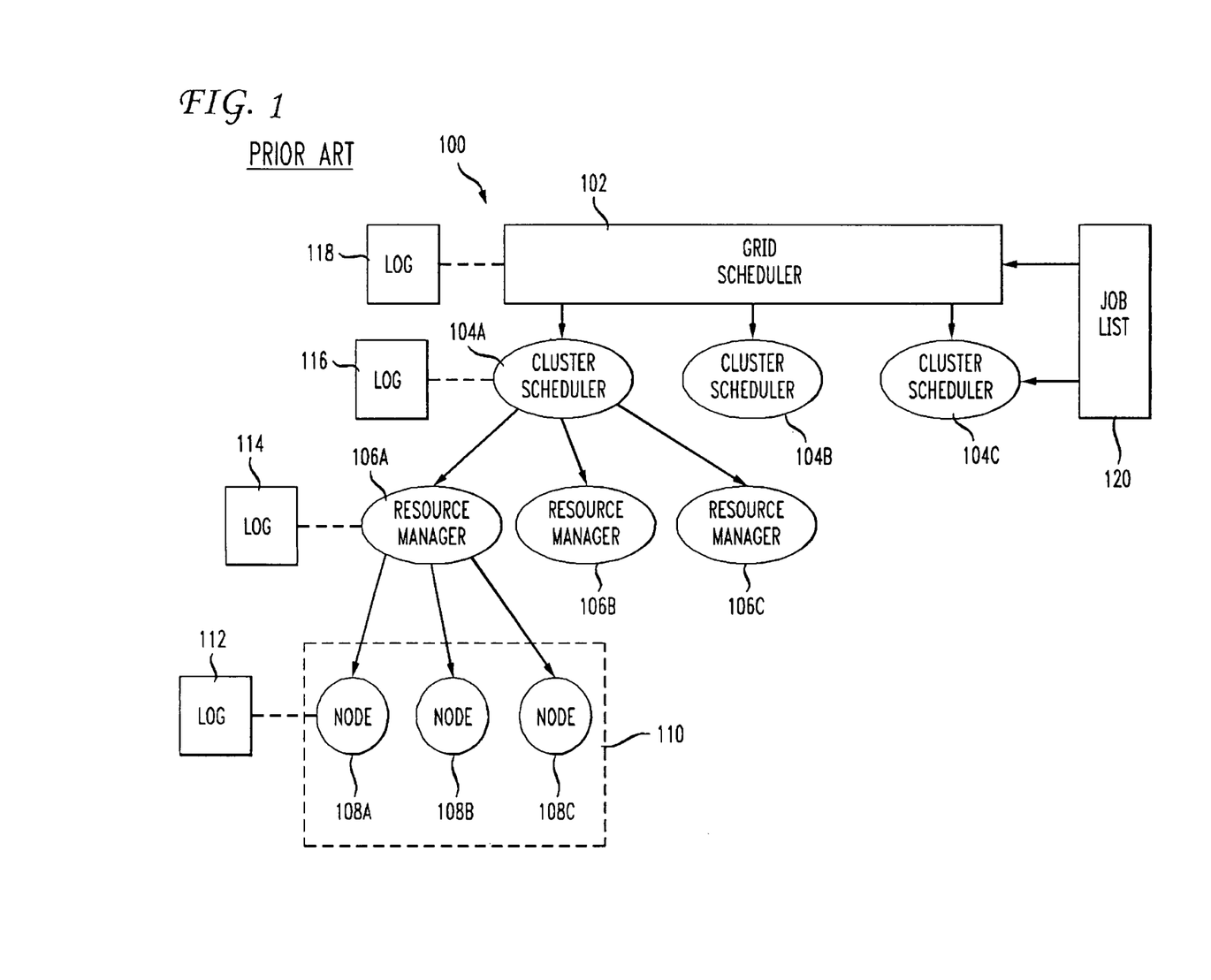
FIG. 1 illustrates the context of the invention by showing a prior art organization of clusters and a grid.

The present invention applies to computer clusters and computer grids. A computer cluster may be defined as a parallel computer that is constructed of commodity components and runs commodity software. FIG. 1 illustrates in a general way an example relationship between clusters and grids. A cluster 110 is made up of a plurality of nodes 108A, 108B, 108C, each containing computer processors, memory that is shared by processors in the node and other peripheral devices such as storage discs connected by a network. A resource manager 106A for the node 110 manages jobs submitted by users to be processed by the cluster. Other resource managers 106B, 106C are also illustrated that may manage other clusters (not shown). An example job would be a weather forecast analysis that is compute intensive that needs to have scheduled a cluster of computers to process the job in time for the evening news report.

A cluster scheduler 104A may receive job submissions and identify using information from the resource managers 106A, 106B, 106C which cluster has available resources. The job would then be submitted to that resource manager for processing. Other cluster schedulers 104B and 104C are shown by way of illustration. A grid scheduler 102 may also receive job submissions and identify based on information from a plurality of cluster schedulers 104A, 104B, 104C which clusters may have available resources and then submit the job accordingly.

Several books provide background information on how to organize and create a cluster or a grid and related technologies. See, e.g., *Grid Resource Management, State of the Art and Future Trends*, Jarek Nabrzyski, Jennifer M. Schopf, and Jan Weglarz, Kluwer Academic Publishers, 2004; and *Beowulf Cluster Computing with Linux*, edited by William Gropp, Ewing Lusk, and Thomas Sterling, Massachusetts Institute of Technology, 2003.

There is a problem in the environment described in FIG. 1. When objects are passed down through the multiple layers from a grid level to a local level, when it comes time to actually troubleshoot or diagnose issues or failures, one can only diagnose failures that occur within any given layer. The logs of any given layer or the interface of any given layer you can only see issues that have occurred at that layer.

When one starts getting into a grid scheduling environment or cluster scheduling environment in which objects or children of objects pass down through multiple layers, it becomes very difficult to track what that object is doing without seeing the messages. Therefore, the prior art model requires an administrator to look at a certain level. When a failure is detected, the administrator checks to see if that failure is local to that layer. If not, then one goes down to the layer below to look at the object and its correlated features and then determine whether the failure is relevant to that layer. If not, the administrator continues going down layers until a root cause of the failure is identified and then the administrator works his or way back up layers.

The issue of failure detection and reporting becomes more pronounced in environments where there are many to one as the administrator cascades down layers. For instance, a grid scheduler 102 may actually be talking to multiple cluster schedulers 104A, 104B and 104C and have a single job that spans multiple cluster schedulers. The cluster schedulers may have a many to one relationship between themselves and resource managers 106A, 106B and 106C causing a single job at a cluster level to be mapped onto multiple resource managers. The resource managers actually map out to multiple nodes 108A, 108B and 108C and therefore tasks associated with each resource manager may be scattered across multiple nodes. In addition, direct startup failures can occur on each one of these person's compute nodes.

When a failure does occur, the system will write information to logs and perform a general failure response routine. FIG. 1 illustrates the logs 112, 114, 116 and 118, each log being related to an individual layer of the cluster or grid.

The problem with this arrangement is that there is a lack of communication between layers in a cluster/grid system. Where a source of failure exists on a node 108A, 108B or 108C, for example an operating system level failure, the reporting and handling of how the cluster or group of cluster should react to that failure is incomplete and deficient. The upper level layers of resource managers, cluster schedulers and grid schedulers cannot receive the information regarding the source of the failure such that they can respond by rescheduling or modifying the cluster environment.

An example can further illustrate the problem. From a job list 120, a user submits a job for processing either on the grid scheduler level or the cluster scheduler level. The grid scheduler 102 communicates With the cluster schedulers 104A, 104B and 104C, and the cluster schedulers commands the resource managers 106A, 106B and 106C to start the submitted job. For example, resource manager 106A attempts to start the job on a number of nodes 108A and 108B. Suppose node 108B actually has an operating system failure wherein it is out of memory. In that case, it will write a detailed message to log 112. The node will then propagate a failure indicating that it cannot start the to the resource manager 106A. The resource manager writes a message to log 114 that the node cannot start will propagate a message to the cluster scheduler 104A. Cluster scheduler 104A writes a message to log 116 that the job cannot start and informs the grid scheduler 102 that for some unknown reason the job cannot start. The grid will write a message to log 118 regarding the failure of the job to start. However, the user looking in his local queue sees the job failed for some unknown reason. What is needed is an improved communication system and method for reporting and handling system failures in a compute environment such as a cluster or a grid.

SUMMARY OF THE INVENTION

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

The invention provides systems, methods and computer-readable media for generating and reporting object messages within the context of a cluster or grid environment. A method comprises retrieving messages from messages logs from multiple layers of a cluster environment, aggregating the retrieved messages into a single location and associating the aggregated messages with an object. The object to which a message is associated may be any type of object within the cluster or grid. For example, the object may be a node, reservation, a job, a resource manager, a license manager or a cluster scheduler.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

The "system" embodiment of the invention may comprise a computing device that includes the necessary hardware and software components to enable a workload manager or a software module performing the steps of the invention. Such a computing device may include such known hardware elements as one or more central processors, random access memory (RAM), read-only memory (ROM), storage devices such as hard disks, communication means such as a modem or a card to enable networking with other computing devices, a bus that provides data transmission between various hardware components, a keyboard, a display, an operating system and so forth. There is no restriction that the particular system embodiment of the invention has any specific hardware components and any known or future developed hardware configurations are contemplated as within the scope of the invention when the computing device operates as is claimed.

To provide an improved communication of system failures in the context of a compute environment such as a cluster or a grid, the present invention utilizes a tunneling system with any given object that routes messages up to higher-level layers of the cluster. The objects that are the source of the failure can be any object such as a node 108A, 108B or 108C, a job, a resource manager 106A, 106B, 106C and so forth. The process involves associating a message to the given object and route the message through a tunneling system up to higher layers in the cluster or grid.

As an example of the method, suppose a failure occurs at the node level where the node does not have enough memory to process a job. The present invention will eliminate the need to go digging through multiple independent logs 112, 114, 116 and 118 at multiple cluster or grid layers. The method comprises retrieving all the messages from the various logs, aggregating the messages and associating the aggregated message directly to the failed object.

With the aggregated information, a user can simply indicate that he would like to query a given object to look at the failures and the object message will include information, in a cluster scheduling case, that there has been a failure of a certain type and an action or event of this type has happened at the cluster level. At the resource manager level, the object message can note that it reported the failure and the failure down at the node/operating system level and another failure was also detected, for example.

The object message enables all information about these failures to be brought into a single location and identify the failed object and any other objects associated with the failure. The object messages have expiration times associated with them so that one can have an instant count to see how many times these messages have shown up. There is an action date when the message was actually attached to the object and there are ownership and various attributes which make it simpler. A main point to the benefit of the object message is that the system can aggregate multiple messages over time and across levels or layers and you bring them all together in a single location making it much easier to track, diagnose, and evaluate the state of the cluster or grid.

Figure 2:
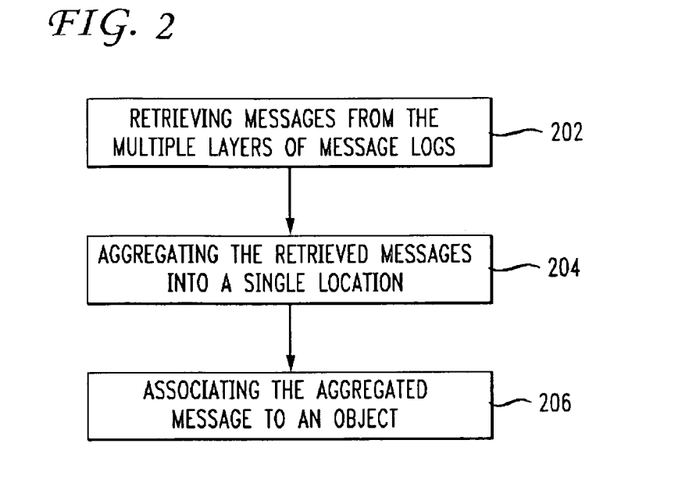
FIG. 2 illustrates a method embodiment of the invention.

FIG. 2 illustrates the method aspect of the invention. The method comprises retrieving messages from multiple layers of message logs within a cluster or a grid (202). Next, the method comprises aggregating the retrieved messages into a single location (204) and associating the aggregated messages to an object (206). With this information retrieved, aggregated and associated, the user who submitted a job can easily query the object and determine the source of the failure and have many more details at his or her disposal in addition to information that the job simply failed for some unknown reason.

There are several ways in which a user of the system could view these messages. One aspect is that these messages can be set by services, such as a cluster scheduler, the resource manager, the operating system itself and so forth. Any of these services can create a message associated with an object. In addition, an administrator can create and associate a message with an object such as a node. The administrator is able to associate a message that saying: "This node is going down for maintenance." The administrator has options on how to annotate the node as they wish.

They can also include any arbitrary expiration time on the message. This is performed either through a GUI or through a command-line approach.

Figure 3A:
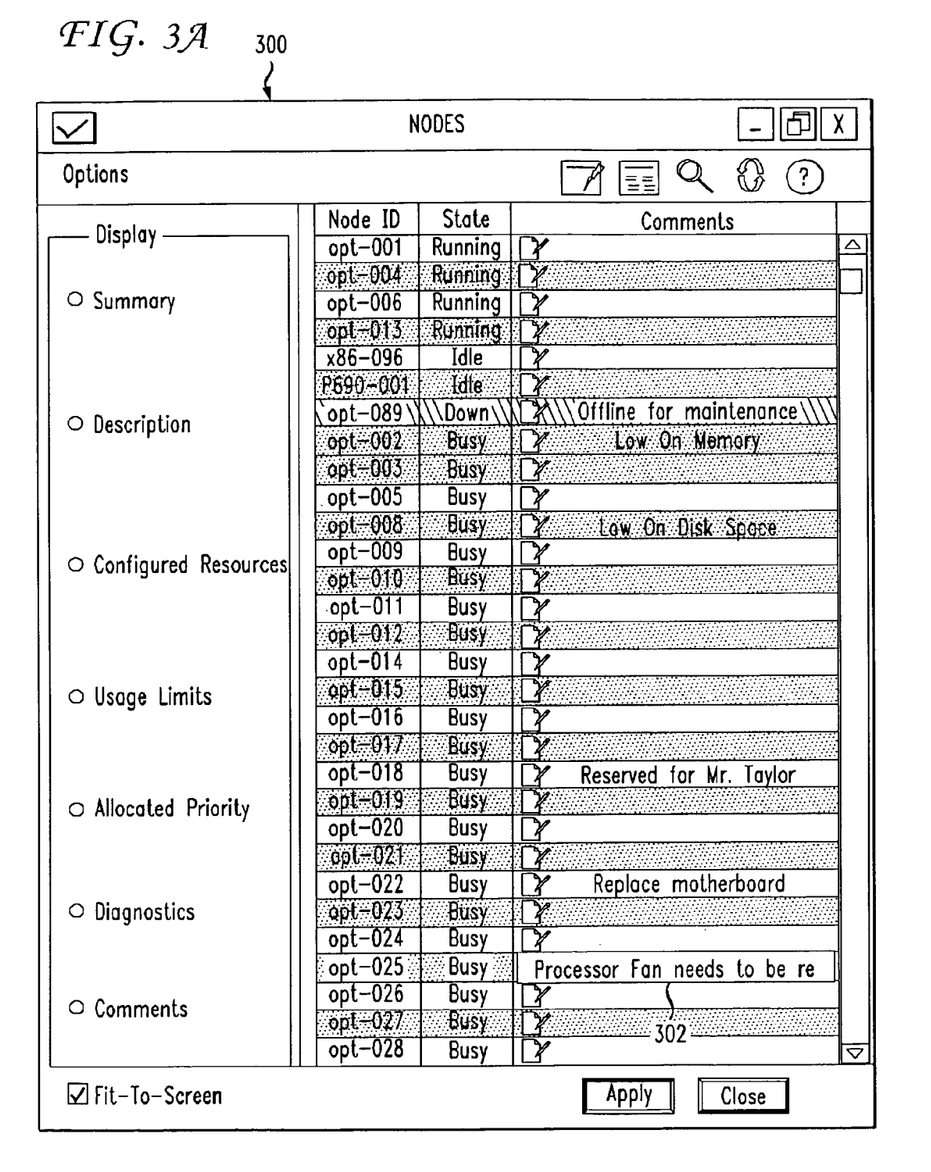
FIGS. 3A - 3D illustrate various graphical user interfaces (GUIs) for creating various object essages.
Figure 3B:
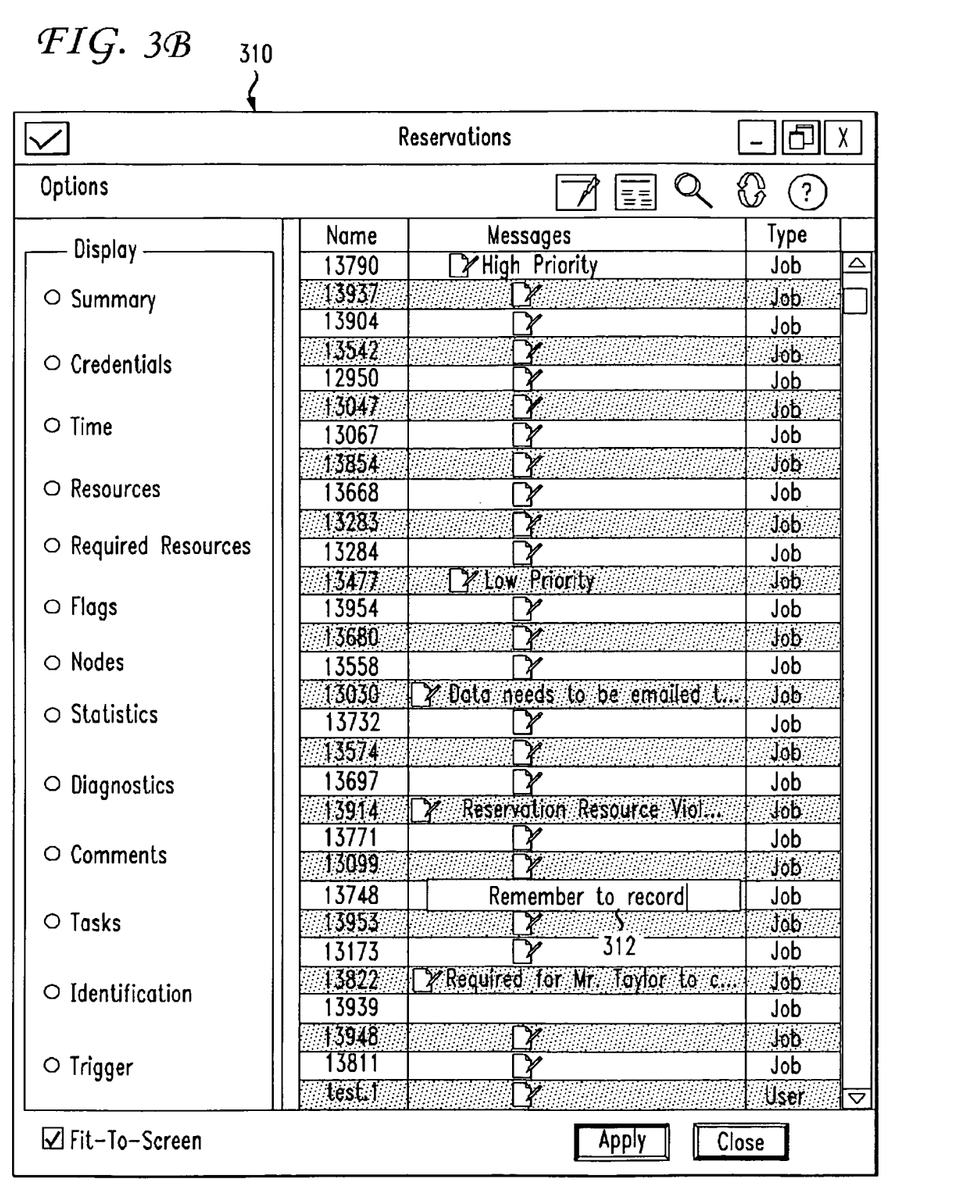
Figure 3C:
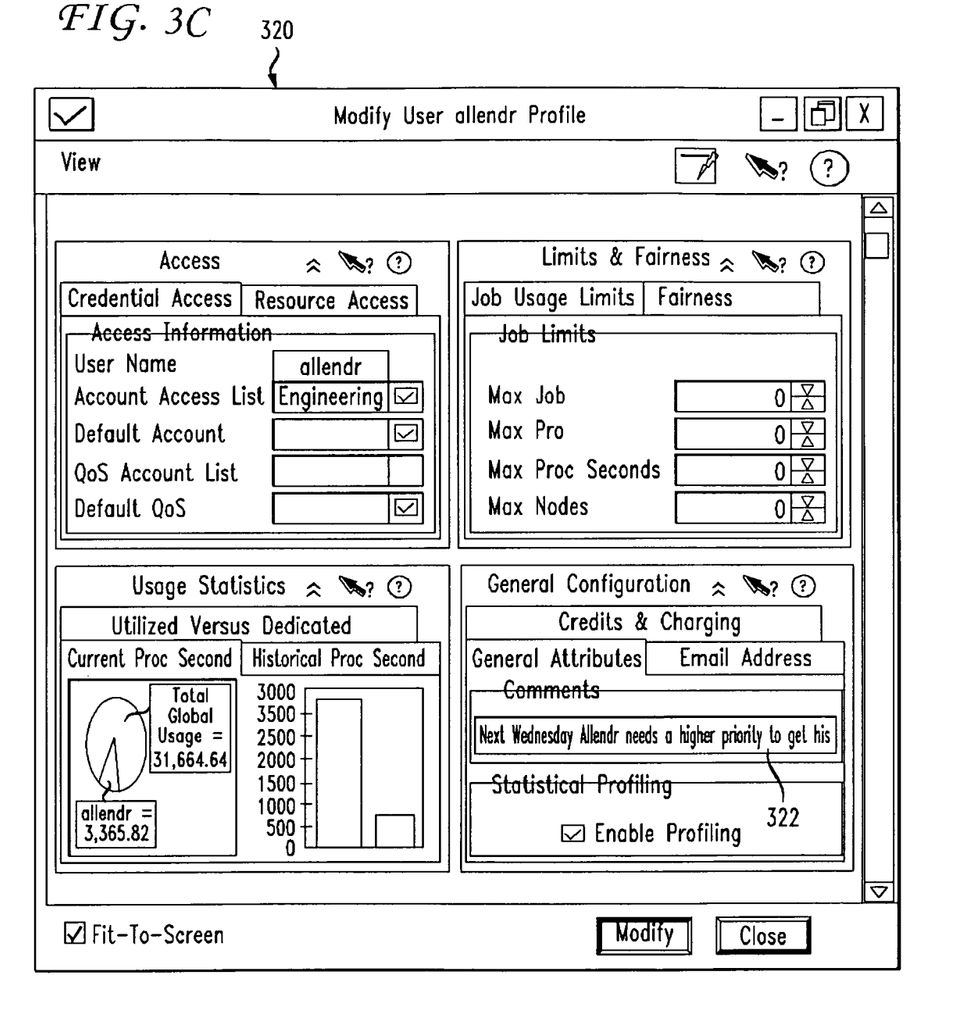
Figure 3D:
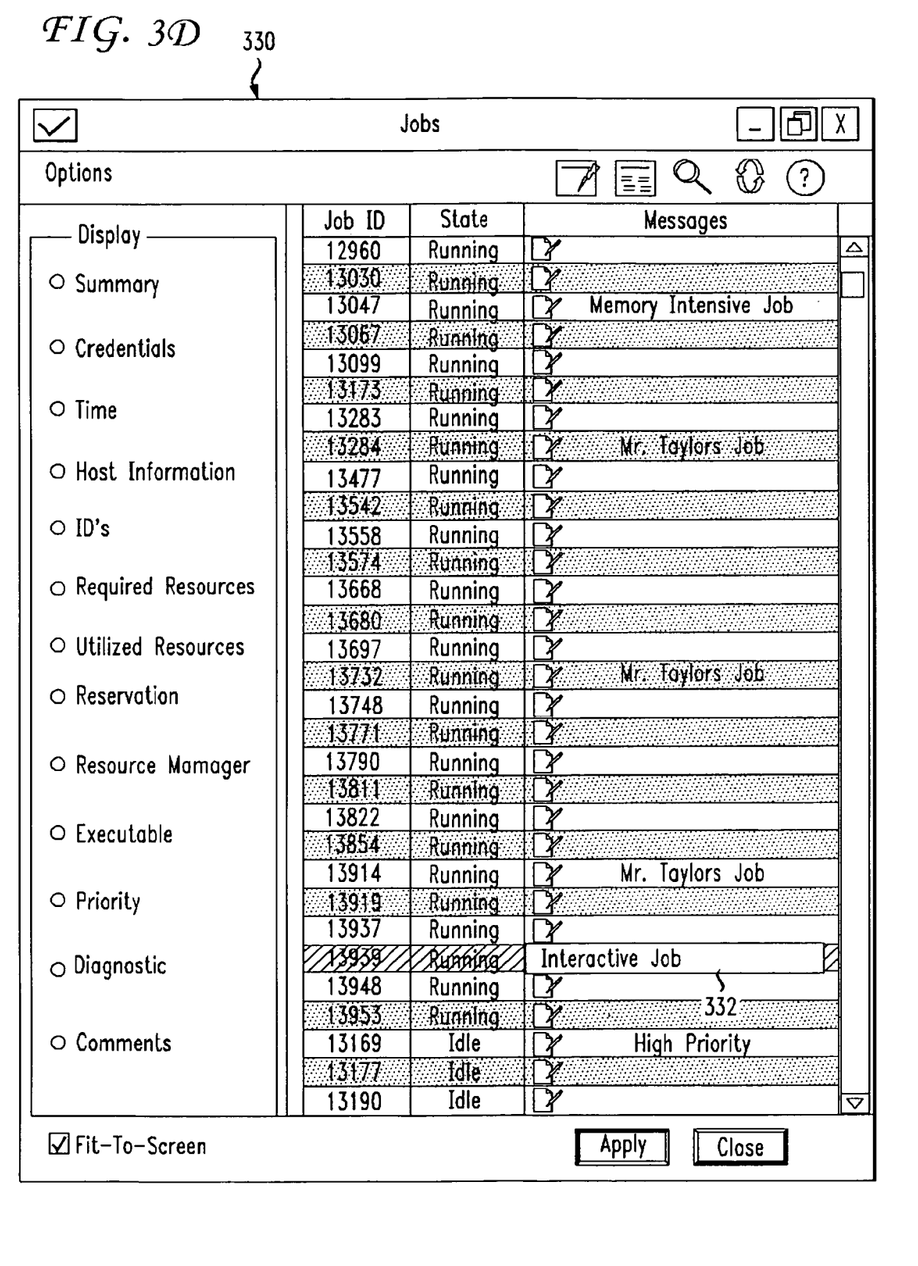

FIGS. 3A-3D illustrate a GUI approach to generating a message associated with an object or other resource. The administrator in this case is able to created a message and assign it to an object such as node as in FIG. 3A. Using the graphical interface 300, the administrator simply points and clicks to highlight a field 302 to type the message and associate the message to an object. FIG. 3B illustrates a window 310 for attaching a comment 312 to a reservation. FIG. 3C enables a comment to be added to a user profile 322 and FIG. 3D illustrates a GUI 330 for adding a comment to a job. A window may be provided to the administrator for modifying the quality of service where the administrator can add comments in a field. Any other object may also be able to have a message attached to it thus enabling the use of that message in aggregation and other purposes in resource management. As is shown in the figures, other features associated with each object may also be shown in the GUI for the ease of managing resources. An alternate way is to create the message using configuration files wherein the node and the message are entered. The following is an example of a command line approach to creating and associating a message to anode Object, as well as a follow-on comment line to check the node:

```
$ mschedctl - c message "Scheduled maintenance completed" - o node: node1
INFO: message added
$ checknode node1
node node1
State:                 Idle
Configured Resources:  PROCS: 1 MEM: 241M SWAP: 863M DISK: 1M
Utilized Resources:    SWAP: 131M
Dedicated Resources:   [None]
Opsys:                 Linux-2.4.21-r.EL        Arch: Linux
Speed                  1.00       CPULoad:      1.100
Network:               DEFAULT
Features:              [NONE]
Classes:               [batch 1:1]
Total Time:   17:32:37
Reservations:
NOTE:                  no reservations on node
ALERT:                 node is in state Idle but load is high
                       (1.100)
NOTE:                  node message "scheduled maintenance
                       completed"
```

As can be seen above, these approaches enable the administrator to provide messages associated with each node that can be retrieved by users when checking the status of the object. It is noted that the object messages may be therefore dynamically created by a system failure or other event that causes the generation of a log message. The example above provides an alternate creation method which is a manual method of creation by an administrator. The manually created messages may also be retrieved and aggregated.

The present invention differs from the prior art in that in the case of failure, say of node 108A, the messages continue to be written out to the logs at the various layers of the cluster or grid. In addition, the messages are propagated up the pipe from the resource manager 106A to the cluster scheduler 104A. But what we've done is that the detailed record that in the current state of the art is being written out to log 108 a, it continues to be written out to log 108 a, but it is also propagated up the pipe, from the resource manager up to the cluster scheduler, the cluster scheduler attaches it to the actual job object, and propagates it up to the grid scheduler. The grid scheduler also propagates the detailed message and the location up to its object. When a user looks at his job he can see that this job failed, the detailed reason is it failed on node 108D, because node 108D is out of swap. He can then send that message off to the administrator where they can take that node offline, perform maintenance, and redeploy the node. This approach is in contrast to the previous method of digging through the logs from various layers in the cluster. It sends it back as an attribute of the object.

The above illustration of an object message applies to an object being a node in a cluster. The basic concepts of the invention are also applicable to other "objects" within the cluster or grid. For example, the object may be a job, reservation, users, groups of users, classes, qualities of service, resource managers, cluster managers, schedulers or peer service interfaces. Any entity within the cluster can be defined as an "object" and therefore an object message may attach. One can actually attach detailed objects and manage the failures and events that are important in the cluster scheduling environment.

The present invention enables a more workload centric approach to handling object failure or providing messages to users, administrators or those submitting jobs. The retrieval, aggregation and association of messages enable the user to obtain important information about what is most important to the user, which is why is my job or reservation not able to run as guaranteed? Therefore, from the standpoint of a user experience, the present invention greatly increases the information that may be gathered and provided to the person submitting jobs to a scheduler.

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Although the above description may contain specific details, they should not be construed as limiting the claims in any way. Other configurations of the described embodiments of the invention are part of the scope of this invention. Accordingly, the appended claims and their legal equivalents should only define the invention, rather than any specific examples given.

I claim:

1. A method comprising:
   retrieving a first message from a first message log from a node layer of a compute environment;
   retrieving a second message from a second message log of a resource manager layer of the compute environment, wherein the resource manager layer maps workload to the node layer as instructed by a workload manager;
   retrieving a third message from a third manager log of a workload manager layer of the compute environment comprising the workload manager;
   aggregating the first message, the second message and the third message into a single location to yield aggregated messages; and
   associating the aggregated messages with one of a user and a group of users.

2. The method of claim 1, further comprising:
   upon receiving an inquiry from a user regarding the reservation, presenting the user with the messages associated with the reservation and the aggregated messages.

3. A system comprising:
   means for retrieving a first message from a first message log from a node layer of a compute environment;
   means for retrieving a second message from a second message log of a resource manager layer of the compute environment, wherein the resource manager layer maps workload to the node layer as instructed by a workload manager;
   means for retrieving a third message from a third manager log of a workload manager layer of the compute environment comprising the workload manager;
   means for aggregating the first message, the second message and the third message into a single location to yield aggregated messages; and
   means for associating the aggregated messages with an object, wherein the object is one of a user and a group of users.

4. A non-transitory computer-readable medium comprising instructions for controlling a computing device to create an object messages in a compute environment, the instructions causing the computing device to perform operations comprising:
   retrieving a first message from a first message log from a node layer of a compute environment;
   retrieving a second message from a second message log of a resource manager layer of the compute environment, wherein the resource manager layer maps workload to the node layer as instructed by a workload manager;
   retrieving a third message from a third manager log of a workload manager layer of the compute environment comprising the workload manager;
   aggregating the first message, the second message and the third message into a single location to yield aggregated messages; and
   associating the aggregated messages with one of a user and a group of users.

5. A system for managing messages in a compute environment, the system comprising:
   a processor; and
   a computer-readable storage medium storing instructions, which, when executed by the processor, cause the processor to perform operations comprising:
      retrieving a first message from a first message log from a node layer of a compute environment;
      retrieving a second message from a second message log of a resource manager layer of the compute environment, wherein the resource manager layer maps workload to the node layer as instructed by a workload manager;
      retrieving a third message from a third manager log of a workload manager layer of the compute environment comprising the workload manager;
      aggregating the first message, the second message and the third message into a single location to yield aggregated messages; and
      associating the aggregated messages with one of a user and a group of users.

* * * * *